(12) United States Patent
Hall et al.

(10) Patent No.: US 7,384,143 B2
(45) Date of Patent: Jun. 10, 2008

(54) METHOD OF MANUFACTURING A CONTACT LENS

(75) Inventors: William Jordan Hall, Atlanta, GA (US); Joseph Michael Lindacher, Lawrenceville, GA (US); Gilberto Hernandez, Aibonito, PR (US); Nelson David Baity, Horse Shoe, NC (US); Donald G. McKillop, Casselberry, FL (US)

(73) Assignee: Novartis AG, Basel (CH)

( * ) Notice: Subject to any disclaimer, the term of this patent is extended or adjusted under 35 U.S.C. 154(b) by 281 days.

(21) Appl. No.: 10/522,443

(22) PCT Filed: Jul. 23, 2003

(86) PCT No.: PCT/EP03/08084

§ 371 (c)(1),
(2), (4) Date: Oct. 27, 2005

(87) PCT Pub. No.: WO2004/011990

PCT Pub. Date: Feb. 5, 2004

(65) Prior Publication Data

US 2006/0055876 A1 Mar. 16, 2006

Related U.S. Application Data

(60) Provisional application No. 60/398,495, filed on Jul. 24, 2002.

(51) Int. Cl.
G02C 7/04 (2006.01)
(52) U.S. Cl. .................... 351/177; 351/160 R
(58) Field of Classification Search ............ 351/160 R, 351/160 H, 161, 177
See application file for complete search history.

(56) References Cited

U.S. PATENT DOCUMENTS 4,134,315 A 1/1979 Bendini .................... 82/14

(Continued)

FOREIGN PATENT DOCUMENTS

WO   WO 00/48036   8/2000

(Continued)

OTHER PUBLICATIONS

European Search Report, PCT/EP03/08084.

(Continued)

*Primary Examiner*—Scott J Sugarman
(74) *Attorney, Agent, or Firm*—Jian Zhou; Robert Ambrose

(57) ABSTRACT

The present invention provides a method for converting a desired lens design to a geometry of a contact lens, preferably a customized contact lens or a contact lens having a complex surface design, to be produced in a computer-controlled manufacturing system. The method comprises: providing a lens design of a contact lens having a central axis, an anterior surface and an opposite posterior surface; projecting a predetermined number of points within a predetermined surface tolerance onto a surface of the lens design along each of a desired number of evenly-spaced semi-diameter spokes, each spoke radiating outwardly from the central axis; and for each of the spokes, generating a semi-meridian which is continuous in first derivative and includes a series of arcs and optionally straight lines, wherein each arc is defined by fitting at least three consecutive points into a spherical mathematical function within a desired concentricity tolerance, wherein each of the straight lines is obtained by connecting at least three consecutive points.

20 Claims, 1 Drawing Sheet

U.S. PATENT DOCUMENTS

| | | |
|---|---|---|
| 4,680,998 A | 7/1987 | Council, Jr. ..................... 82/1 |
| 4,884,482 A | 12/1989 | Council, Jr. ................. 82/1.11 |
| 4,947,715 A | 8/1990 | Council, Jr. ................. 82/1.11 |
| 5,452,031 A | 9/1995 | Ducharme .................. 351/177 |
| 5,880,809 A | 3/1999 | Lieberman et al. ..... 351/160 R |
| 5,953,098 A | 9/1999 | Lieberman et al. ..... 351/160 R |
| 6,122,999 A | 9/2000 | Durazo et al. ............... 82/1.11 |
| 6,241,355 B1 | 6/2001 | Barsky ....................... 351/177 |
| 6,340,229 B1 | 1/2002 | Lieberman et al. ......... 351/160 |
| 2001/0033361 A1 | 10/2001 | Edwards .................... 351/177 |

FOREIGN PATENT DOCUMENTS

| | | |
|---|---|---|
| WO | WO 02/48779 | 6/2002 |

OTHER PUBLICATIONS

"Optoform® 50—Engineering Sepecifications" Last Revised May 5, 2000.

METHOD OF MANUFACTURING A CONTACT LENS

This application is a national stage filing under 35 U.S.C. 371 of International Application No. PCT/EP03/08084 filed Jul. 23, 2003, which claims benefits of U.S. Provisional Patent Application No. 60/398,495 filed Jul. 24, 2002.

The present invention relates to a method for designing and/or producing a contact lens, preferably a customized contact lens or a contact lens having a complex surface design. In particular, the present invention is related to a method for converting a desired lens design to a geometry of a contact lens to be produced in a manufacturing system.

Contact lenses are widely used for correcting many different types of vision deficiencies. Current contact lenses have relatively simple surface design, generally are rotationally-symmetric or toric, and can only correct low-order aberrations of the human eye, such as defocus, astigmatism and prism. Current contact lenses are unable to correct high-order monochromatic aberrations of the human eye, such as a non-standard amount of spherical aberration, coma, and other irregular high-order aberrations. These high order aberrations blur images formed on the retina, which can impair vision. The impact of these higher-order aberrations on retinal image quality can become significant in some cases, for example, in older eyes, in normal eyes with large pupils, and in the eyes of many people with irregular astigmatism, keratoconus, corneal dystrophies, post penetrating keratoplasty, scarring from ulcerative keratitis, corneal trauma with and without surgical repair, and suboptimal outcome following refractive surgery. For those people, visual acuity of 20/20 or better can be achieved with customized contact lenses or contact lenses capable of correcting high-order monochromatic aberrations of the human eye. Unlike current contact lenses, customized contact lenses or contact lenses capable of correcting high order aberrations inevitably need to have a complex surface design without restrictions of rotational symmetry.

Advances in computer aided design (CAD) technologies may permit to design a customized contact lens, for example, using polynomials and/or spline-based mathematical functions, and then to construct mathematically high order surfaces, such as NURBS (Non-Uniform Rational B-splines) or Beizier surfaces, of an intended design. The mathematically high order surfaces of the intended design then needs to be converted into control signals, which control a computer controllable manufacturing device (for example, lathes, grinding and milling machines, molding equipments, or lasers) to produce directly a customized contact lens or molding tools for producing a customized contact lens. However, few currently-known processes could convert mathematically high order surfaces of a lens design into control signals or at least in an automatic manner. Therefore, there is a need for a method capable of automatically converting mathematically high order surfaces of a lens design into control signals, which control a computer controllable manufacturing device to produce a customized contact lens.

An object of the invention is to provide a method for converting mathematically high order surfaces of a lens design into control signals, which control a computer controllable manufacturing device to produce a customized contact lens.

Another object of the invention is to provide a method for producing a customized contact lens having a complex surface design without restrictions of rotational symmetry.

SUMMARY OF THE INVENTION

In accomplishing the foregoing, there is provided, in accordance with one aspect of the present invention, a method for converting a desired lens design to a geometry of an ophthalmic lens to be produced in a manufacturing system. The ophthalmic lens can be any contact lens, preferably a customized contact lens or a contact lens having a complex surface design. The method comprises: providing a lens design of a contact lens having a central axis, an anterior surface and an opposite posterior surface; projecting a predetermined number of points within a predetermined surface tolerance onto a surface of the lens design along each of a desired number of evenly-spaced semi-diameter spokes, each spoke radiating outwardly from the central axis; and for each of the spokes, generating a semi-meridian which is continuous in first derivative and includes a series of arcs and optionally straight lines, wherein each arc is defined by fitting at least three consecutive points into a spherical mathematical function within a desired concentricity tolerance, wherein each of the straight lines is obtained by connecting at least three consecutive points.

The invention, in another aspect, provides a method for producing an ophthalmic lens, preferably a customized contact lens or a contact lens having a complex surface design. The method comprises: providing a lens design of a contact lens having a central axis, an anterior surface and an opposite posterior surface; projecting a predetermined number of points within a predetermined tolerance onto a surface of the lens design along each of a desired number of evenly-spaced semi-diameter spokes, each spoke radiating outwardly from the central axis; for each of the spokes, generating a semi-meridian which is continuous in first derivative and includes a series of arcs and optionally straight lines, wherein each arc is defined by fitting at least three consecutive points into a spherical mathematical function, wherein each of the straight lines is obtained by connecting at least three consecutive points; generating a data file containing information about the geometry of the lens in a form that is interpretable by a computer-controlled manufacturing device; and producing the contact lens or a molding tool for making the contact lens using the computer-controlled manufacturing device.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1:
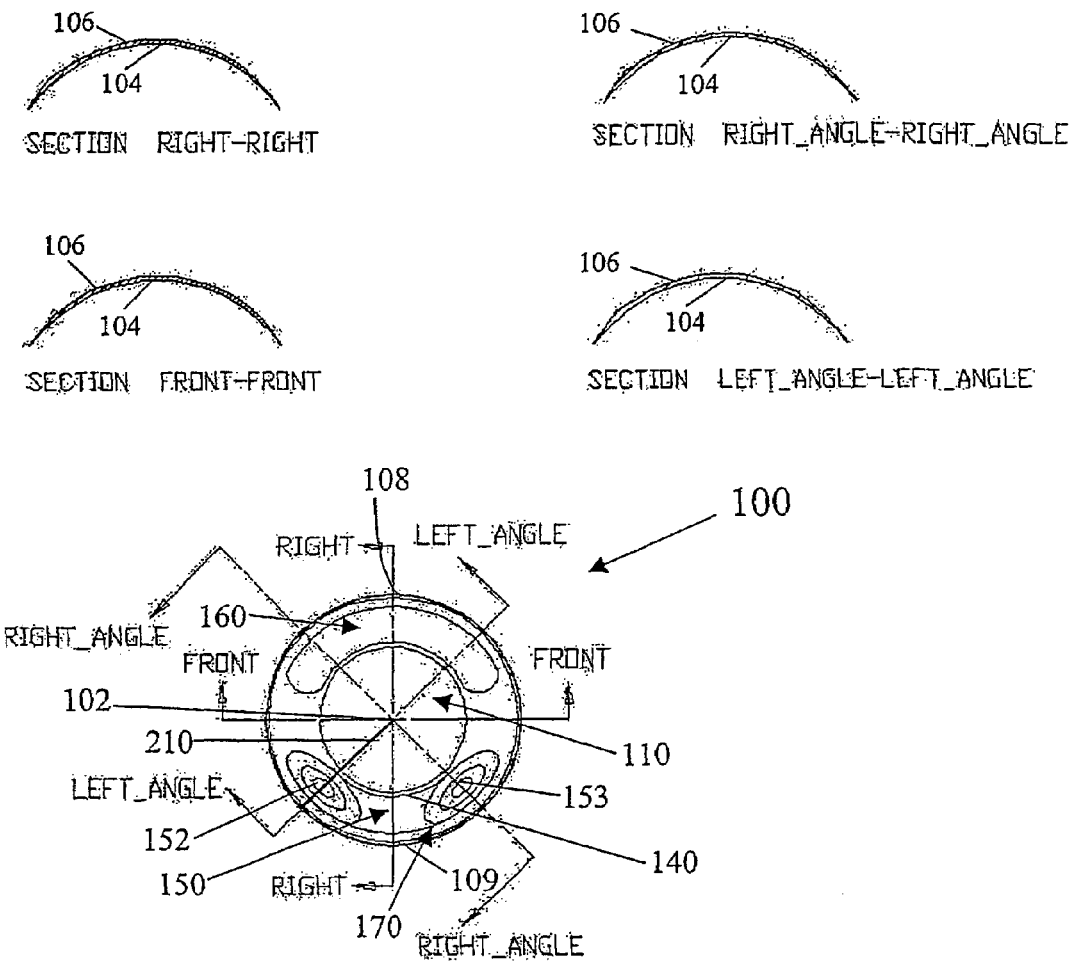
FIG. 1 schematically shows the design of a translating contact lens having an optical zone, a ramped ridge zone below the optical zone, and a ridge-off zone above the optical zone on the anterior surface of the translating contact lens.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one embodiment, the present invention provides a method for converting a desired lens design to a geometry of a contact lens to be produced in a manufacturing system. The method of the invention comprises: providing a lens design of a contact lens having a central axis, an anterior surface and an opposite posterior surface; projecting a predetermined number of points within a predetermined surface tolerance onto a surface of the lens design along each of a number of evenly-spaced semi-diameter spokes, each spoke radiating outwardly from the central axis; and for each of the spokes, generating a semi-meridian which is continuous in first derivative and includes a series of arcs and optionally straight lines, wherein each arc is defined by fitting at least three consecutive points into a spherical mathematical function within a desired concentricity tolerance, wherein each of the straight lines is obtained by connecting at least three consecutive points.

It is well known to those skilled in the art that a lens design for a contact lens can be carried out by using an optical computer aided design (CAD) system and a mechanical CAD system.

An optical CAD system is used to design an optical model lens. "An optical model lens" refers to an ophthalmic lens that is designed in a computer system and generally does not contain other non-optical systems which are parts of an ophthalmic lens. Exemplary non-optical systems of a contact lens include, but are not limited to bevel, lenticular, and edge that joins the anterior and posterior surfaces of a contact lens.

"A bevel" refers to a non-optical surface zone located at the edge of the posterior surface of a contact lens. Generally, the bevel is a significantly flatter curve and is usually blended with the base curve (optical posterior surface) of a contact lens and appears as an upward taper near the edge. This keeps the steeper base curve radius from gripping the eye and allows the edge to lift slightly. This edge lift is important for the proper flow of tears across the cornea and makes the lens fit more comfortably.

"A lenticular" refers to a non-optical surface zone of the anterior surface of a contact lens between the optical zone and the edge. The primary function of the lenticular is to control the thickness of the lens edge.

Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a set of mechanical lens design that includes optical zones, non-optical zones and non-optical features. Exemplary non-optical zones and features of a contact lens include, but are not limited to bevel, lenticular, edge that joins the anterior and posterior surfaces of a contact lens, orientation features, and the like. Exemplary orientation features include, but are not limited to, a prism ballast or the like that uses a varying thickness profile to control the lens orientation, a faceted surface (e.g., ridge-off zone) in which parts of the lens geometry is removed to control the lens orientation, a ridge feature which orients the lens by interacting with the eyelid. Preferably, when transforming the design of an optimized optical model lens into a mechanical lens design, some common features of a family of contact lenses can be incorporated.

Any know, suitable mechanical CAD system can be used in the invention. Preferably, a mechanical CAD system capable of representing precisely and mathematically high order surfaces is used to design a contact lens. An example of such mechanical CAD system is Pro/Engineer.

Preferably, the design of a contact lens may be translated back and forth between the optical CAD and mechanical CAD systems using a translation format which allows a receiving system, either optical CAD or mechanical CAD, to construct NURBs or Beizier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for presbyopic design because multiple zones can be blended, analyzed and optimized.

After the optical and mechanical design for a contact lens is completed, a lens design is typically in a neutral file format, for example, such as IGES or VDA, or in a proprietary file format (for example, a Pro/E file format). A predetermined number of points are projected within a predetermined surface tolerance onto a surface of the lens design along each of a desired number of evenly-spaced semi-diameter spokes.

A "surface tolerance" refers to the position deviation of a projected point from an ideal position on a surface of a lens design. The deviation can be in the direction either parallel or perpendicular to the central axis of a lens design.

A "spoke" refers to a ray radiating outwardly from the central axis and is perpendicular to the central axis. A "semi-diameter spoke" refers to a line segment from the central axis to the edge of a lens design.

"Evenly-spaced semi-diameter spokes" means that all semi-diameter spokes radiate outwardly from the central axis and separate from each other by one equal angle. The number of evenly-spaced semi-diameter spokes can be any number, depending on the complex features of a surface of a lens design and/or on the specification of a computer controllable lathe. Preferably, a numerically controlled lathe from Precitech, Inc., for example, such as Optoform ultra-precision lathes (models 30, 40, 50 and 80) having Variform piezo-ceramic fast tool servo attachment, is used in the invention. For Optoform ultra-precision lathes (models 30, 40, 50 and 80) having Variform piezo-ceramic fast tool servo attachment, the number of semi-meridians can be 1, 24, 96 or 384, preferably is 24 or 96.

Points can be projected onto a surface of the lens design along a semi-diameter spoke in a direction parallel to the central axis or in a direction normal to the surface. The number of points to be projected can be determined in a various ways.

In a first example, the number of points to be projected along one semi-diameter spoke can be determined by dividing the distance from the central axis to lens edge by a point spacing of at least 1 micron, preferably from about 5 to about 25 microns, more preferably from about 5 to about 15 microns, even more preferably about 10 microns. A "point spacing" refers to a distance between two points along the semi-diameter spoke.

In a second example, the number of points to be projected along one semi-diameter spoke can be determined as follows. First, evenly-spaced points are projected along a semi-diameter probing spoke at an azimuthal angle at which complicated features of the surface are located. Each pairs of points are separating by a point spacing of 5 to 25 microns. Then, all of the projected points are divided into a series of groups, each group composed of three consecutive points, a first point, a middle point and a third point. Each of the points can belong to either one group or two groups. For example, in a directional order from the central axis to the edge, group j is composed of point i, point i+1, and point i+2; group j+1 is composed of point i+1, point i+2, and point i+3. One group at a time from the central axis to the edge or from the edge to the central axis, the curvature of the surface at the middle point of the group is analyzed by comparing a distance between the middle point i+1 and a line linking the first point i and the third point i+2 of the corresponding group with the predetermined surface tolerance. If the distance between the middle point and the line linking the first and third points oft the group is larger than the predetermined surface tolerance, the curvature of the surface at that point is sharp and an additional point needs to be projected between the first and the middle points in that group. The point spacing between the first and the additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is less than or equal to the predetermined surface tolerance. In this way, the number of the points to be projected onto the surface of the lens design along each of the desired number of evenly-spaced semi-diameter spokes and point spacings for a series of pairs of neighboring points can be determined.

In a preferred embodiment, after the number of points are predetermined according to the procedure described in the first example described above and then projected onto a surface of the lens design along each of a number of evenly-spaced semi-diameter spokes, the curvature of the surface at each of the projected points alone each of semi-diameter spokes is checked to see if it changes sharply. Where the curvature of the surface at a projected point changes sharply, additional points may need to be projected to faithfully represent the lens design. All of the points along each of semi-diameter spokes are grouped into a series of groups, each group composed of three consecutive points, a first point, a middle point and a third point. Each of the points can belong to either one group or two groups. One group at a time from the central axis to the edge or from the edge to the central axis, the curvature of the surface at the middle point of the group is analyzed by comparing a distance between the middle point and a line linking the first point and the third point of the corresponding group with the predetermined surface tolerance. If the distance between the middle point and the line linking the first and third points of the group is larger than the predetermined surface tolerance, an additional point is projected between the first and the middle points in that group, wherein point spacing between the first and additional points is equal to point spacing between the additional and middle points. After adding an additional point, all of the points included the newly added point is regrouped again and the curvature of the surface at the middle point of each of the series of groups is analyzed. Such iterative procedure is, repeated until the distance between the middle point of each of the series of groups and the line linking the first and the third points of corresponding group along the probing spoke is within the predetermined surface tolerance. In this way, any complex features of a surface of the lens design can be reproduced.

For each of the semi-diameter spokes, a semi-meridian which is continuous in first derivative is generated. The semi-meridian includes a series of arcs and optionally straight lines, wherein each arc is defined by fitting at least three consecutive points into a spherical mathematical function within a desired concentricity tolerance. A "concentricity tolerance" refers to the allowed deviation of a point from a given arc. Each of the straight lines is obtained by connecting at least three consecutive points. Preferably, arc fitting routine is started from the central axis to the edge.

After converting a desired lens design to a geometry of a contact lens to be produced in a manufacturing system, a data file is generated to contain information about the geometry of the lens in a form that is interpretable by a computer-controlled manufacturing device.

In another embodiment, the present invention provides a method for producing an ophthalmic lens, preferably a customized contact lens or a contact lens having a complex surface design. The production method comprises: providing a lens design of a contact lens having a central axis, an anterior surface and an opposite posterior surface; projecting a predetermined number of points within a predetermined tolerance onto a surface of the lens design along each of a number of evenly-spaced semi-diameter spokes, each spoke radiating outwardly from the central axis; for each of the spokes, generating a semi-meridian which is continuous in first derivative and includes a series of arcs and optionally straight lines, wherein each arc is defined by fitting at least three consecutive points into a spherical mathematical function, wherein each of the straight lines is obtained by connecting at least three consecutive points; generating a data file containing information about the geometry of the lens in a form that is interpretable by a computer-controlled manufacturing device; and producing the contact lens or a molding tool for making the contact lens using the computer-controlled manufacturing device.

A computer controllable manufacturing device is a device that can be controlled by a computer system and that is capable of producing directly an ophthalmic lens or an optical tools for producing an ophthalmic lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform ultra-precision lathes (models 30, 40, 50 and 80) having Variform piezo-ceramic fast tool servo attachment.

A data file containing information about the geometry of the lens in a form that is interpretable by a computer-controlled manufacturing device can be generated to conform with the specification of a numerically controlled lathe. For example, a zero semi-meridian is required to be generated before the Variform can perform a non-symmetric cutting pass. The zero semi-meridian is based on the average height of each of the other meridians at each radial location. The zero semi-meridian gives the Variform a zero position on which it can base its oscillation calculations. Then, a mini-file is created which includes both the information for the header and the geometry of the lens in a form that can be interpreted by the lathe. Each of semi-meridians has a number of zones or arcs. Since all semi-meridians must have the same number of zones, zero diameter arcs can be created or last zone is copy for a number of time to equalize the numbers of zones for all meridians. After the file is complete, it can be loaded into the lathe and run to produce a contact lens.

The methods of the present invention can be used in manufacturing a contact lens having a complex surface design, for example, the complex design of a translating contact lens, shown in FIG. 1. The translating contact lens 100 has a top 108, a bottom 109, a central axis 102, a posterior surface 104 and an opposite anterior surface 106. The anterior surface 106 includes an optical zone 110, a transition zone 140, a ramped ridge zone 150, a ridge-off zone 160 and a lenticular zone 170.

The transition zone 140 provides a smooth transition from the ramped ridge zone 150 to the optical zone 110. The transition zone 140 extends from the lower edge 114 of the optical zone 110 to the upper edge of the ramped ridge zone 156.

The ramped ridge zone 150 provides vertical translation support for the lens 100. The ramped ridge zone 150 is disposed below the optical zone 110. The ramped ridge zone 150 has an upperedge, a lower ramped edge, a latitudinal ridge extends outwardly from the anterior surface 106, and a ramp that extends downwardly from the lower ramped edge. When the eye moves in a downward direction, the ramp, the lower ramp edge and the latitudinal ridge can engage with the user's lower eyelid, and supports the lens 100, thereby allowing translation of the lens 100 across the surface of the eye. The elevation height of the latitudinal ridge are higher at the both ends than in the middle and two bumps (152, 153) are formed at the two ends. The latitudinal ridge has a mirror symmetry with respect to a plan, which cuts the latitudinal ridge in the middle into two equal part and contains the central axis. Such latitudinal ridge can improve wearer's comfort, since translating stress may be uniformly distributed over the entire lens-interacting portion of the lower eyellid. Such a preferred feature of a ramped ridge zone can be achieved by using a continuous surface defined by a conic or spline-based mathematical function or made of several different surface patches.

The transition from the lenticular zone to the ramped ridge zone is continuous in first derivative (tangent to each other), preferably continuous in second derivative. The ramp has a cuvature or slope that provides a varying degree of interaction between the ramped ridge zone and the lower eyelid depending on where the lower eyelid stricks the ramped ridge zone. With such ramp, the lower eyelid of the eye is engaged with at least some portion of the ramped ridge zone at all times and thereby effect the lens position on the eye in primary gaze (horizontal gaze) and/or lens translating amount across the surface of an eye when the eye changes from the horizontal (primary) gaze (distant vision) to a down gaze (intermediate or near vision).

One advantage of incorporating a ramp in the ramped ridge zone is that it can provide a smooth transition zone for the eyelid to "ramp up" the ridge. This gradual engagement will benefit the wearer by increasing comfort and reducing lens sensation in the eye because the ridge will always be engaged.

Another advantage of incorporating a ramp in the ramped ridge zone is that, since the ramp slope can determine lens position on an eye in primary gaze (horizontal), a lens design for a desired visual performance can be reliably implemented in the production of translating contact lenses.

Conversion of the lens design shown in FIG. 1 is carried out as follows. First, an user defines a set of parameters, such as a surface tolerance, a concentricity tolerance, orientation of the lens design, the number of spokes to be generated for each of the anterior and posterior surfaces, creating zero point at 0,0, orientation of Z-axis, and type of lens surface (concave or convex surface) to be converted into a geometry. Then, the number of points to be projected onto the a surface of the lens design (for example, the anterior surface) along each of the number of evenly-spaced semi-diameter spokes in a direction parallel to the central axis. A semi-diameter spoke 210 at an azimuthal angle at which one of the two bumps of the anterior surface is located is selected as the semi-diameter probing spoke. Evenly-spaced points are projected along the semi-diameter probing spoke, wherein each pairs of points are separating by a point spacing of 10 microns.

Then, all of the projected points are divided into a series of groups, each group composed of three consecutive points, a first point, a middle point and a third point. Each of the points can belong to either one group or two groups. One group at a time from the central axis to the edge or from the edge to the central axis, the curvature of the surface at the middle point of the group is analyzed by comparing a distance between the middle point and a line linking the first point and the third point of the corresponding group with the predetermined surface tolerance. If the distance between the middle point and the line linking the first and third points of the group is larger than the predetermined surface tolerance, an additional point is projected between the first and the middle points in that group, wherein point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this way, the number of the points to be projected onto the surface of the lens design along each of the desired number of evenly-spaced semi-diameter spokes and point spacings for a series of pairs of neighboring points are determined.

The above-determined number of points are projected onto the anterior surface of the lens design shown in FIG. 1 along each of 96 semi-diameter spokes. For each of the 96 semi-diameter spokes, a semi-meridian which is continuous in first derivative is generated. The semi-meridian includes a series of arcs and optionally straight lines, wherein each arc is defined by fitting at least three consecutive points into a spherical mathematical function within a desired concentricity tolerance. Each of the straight lines is obtained by connecting at least three consecutive points. Preferably, arc fitting routine is started from the central axis to the edge.

Similarly, conversion of the posterior surface of the lens design shown in FIG. 1 into a geometry can be carried out according to the above described procedure.

After converting the lens design shown in FIG. 1 to a geometry of a contact lens to be produced in a manufacturing system, a mini-file containing both the information for the header and the information about the geometry of the lens is generated. This mini-file also contains a zero semi-meridian that is based off the average height of each of the other meridians at each radial location and that gives the Variform a zero position on which it can base its oscillation calculations. In this mini-file, all semi-meridians have the same number of zones. This is accomplished by copying the last zone of a semi-meridian for a number of time to equalize the numbers of zones for all meridians. After the mini-file is complete, it is loaded into an Optoform ultra-precision lathe (models 30, 40, 50 or 80) having Variform piezo-ceramic fast tool servo attachment and run to produce a translating contact lens.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method for converting a desired lens design to a geometry of a contact lens to be produced in a manufacturing system, the method comprises:
   (1) providing a lens design of a contact lens having a central axis, an anterior surface and an opposite posterior surface;
   (2) projecting a predetermined number of points within a predetermined surface tolerance onto a surface of the lens design along each of a number of evenly-spaced semi-diameter spokes, each spoke radiating outwardly from the central axis;
   (3) for each of the spokes, generating a semi-meridian which is continuous in first derivative and includes a series of arcs and optionally straight lines, wherein each arc is defined by fitting at least three consecutive points into a spherical mathematical function within a specified concentricity tolerance, wherein each of the straight lines is obtained by connecting at least three consecutive points; and
   (4) generating a data file containing information about the geometry of the lens in a form that is interpretable by a computer-controlled manufacturing device.

2. A method of claim 1, wherein the number of the points to be projected onto the surface of the lens design along each of the semi-diameter spokes is determined by dividing the distance from the central axis to lens edge by a point spacing of at least about 1 micron.

3. A method of claim 2, wherein the point spacing is from about 5 to about 25 microns.

4. A method of claim 3, further comprising projecting additional points in a region where the curvatures of the surface change sharply.

5. A method of claim 4, wherein the step of projecting additional points is performed according to a procedure including:
   (i) grouping all of the points projected along a semi-diameter spoke into a series of groups, each group composed of three consecutive points, a first point, a middle point and a third point;
   (ii) one group at a time from the central axis to the edge or from the edge to the central axis, analyzing the curvature of the surface at the middle point of the group by comparing a distance between the middle point and a line linking the first and the third points of the corresponding group with the predetermined surface tolerance;
   (iii) projecting an additional point between the first and the middle points in the group, provided that the distance between the middle point and the line linking the first and third points of the group is larger than the predetermined surface tolerance; and
   (iv) repeating steps (i) to (iii) until the distance between the middle point of each of the series of groups of points projected along the semi-diameter spoke and the line linking the first and the third points of corresponding group is equal to or less than the predetermined surface tolerance.

6. A method of claim 5, wherein the number of the evenly-spaced semi-diameter spokes is a number between 24 to 384.

7. A method of claim 6, wherein the contact lens is a customized contact lens or a contact lens having a complex surface design.

8. A method of claim 1, wherein the number of the points to be projected onto the surface of the lens design along each of the number of evenly-spaced semi-diameter spokes is determined according to a procedure including:
   (I) projecting evenly-spaced points separating by a point spacing of about 5 to about 25 microns along a semi-diameter probing spoke at an azimuthal angle at which one or more complicated features of the surface are located;
   (II) dividing all of the points into a series of groups, each group composed of three consecutive points, a first point, a middle point and a third point;
   (III) one group at a time from the central axis to the edge or from the edge to the central axis, analyzing the curvature of the surface at the middle point of the group by comparing a distance between the middle point and a line linking the first and the third points of the corresponding group with the predetermined surface tolerance;
   (IV) projecting an additional point between the first and the middle points in the group, provided that the distance between the middle point and the line linking the first and third points of the group is larger than the predetermined surface tolerance, wherein point spacing between the first and additional points is equal to point spacing between the additional and middle points;
   (V) repeating steps (II) to (IV) until the distance between the middle point of each of the series of groups and the line linking the first and the third points of corresponding group along the probing spoke is equal to or less than the predetermined tolerance; and (VI) outputting the number of the points to be projected onto the surface of the lens design along each of the number of evenly-spaced semi-diameter spokes and point spacings for pairs of neighboring points.

9. A method of claim 8, wherein the number of the evenly-spaced semi-diameter spokes is a number between 24 to 384.

10. A method of claim 9, wherein the contact lens is a customized contact lens or a contact lens having a complex surface design.

11. A method for producing a contact lens, comprises:
(1) providing a lens design of a contact lens having a central axis, an anterior surface and an opposite posterior surface;
(2) projecting a predetermined number of points within a predetermined tolerance onto a surface of the lens design along each of a number of evenly-spaced semi-diameter spokes, each spoke radiating outwardly from the central axis;
(3) for each of the spokes, generating a semi-meridian which is continuous in first derivative and includes a series of arcs and optionally straight lines, wherein each arc is defined by fitting at least three consecutive points into a spherical mathematical function, wherein each of the straight lines is obtained by connecting at least three consecutive points;
(4) generating a data file containing information about the geometry of the lens in a form that is interpretable by a computer-controlled manufacturing device; and
(5) producing the contact lens or a molding tool for making the contact lens using the computer-controlled manufacturing device.

12. A method of claim 11, wherein the number of the points to be projected onto the surface of the lens design along each of the semi-diameter spokes is determined by dividing the distance from the central axis to lens edge by a point spacing of at least about 1 micron.

13. A method of claim 12, wherein the point spacing is from about 5 to about 25 microns.

14. A method of claim 13, further comprising projecting additional points in a region where the curvatures of the surface change sharply.

15. A method of claim 14, wherein the step of projecting additional points is performed according to a procedure including:
(i) grouping all of the points projected along a semi-diameter spoke into a series of groups, each group composed of three consecutive points, a first point, a middle point and a third point;
(ii) one group at a time from the central axis to the edge or from the edge to the central axis, analyzing the curvature of the surface at the middle point of the group by comparing a distance between the middle point and a line linking the first and the third points of the corresponding group with the predetermined surface tolerance;
(iii) projecting an additional point between the first and the middle points in the group, provided that the distance between the middle point and the line linking the first and third points of the group is larger than the predetermined surface tolerance; and (iv) repeating steps (i) to (iii) until the distance between the middle point of each of the series of groups of points projected along the semi-diameter spoke and the line linking the first and the third points of corresponding group is equal to or less than the predetermined surface tolerance.

16. A method of claim 15, wherein the number of the evenly-spaced semi-diameter spokes is a number between 24 to 384.

17. A method of claim 16, wherein the contact lens is a customized contact lens or a contact lens having a complex surface design.

18. A method of claim 11, wherein the number of the points to be projected onto the surface of the lens design along each of the number of evenly-spaced semi-diameter spokes is determined according to a procedure including:
(I) projecting evenly-spaced points separating by a point spacing of about 5 to about 25 microns along a semi-diameter probing spoke at an azimuthal angle at which one or more complicated features of the surface are located;
(II) dividing all of the points into a series of groups, each group composed of three consecutive points, a first point, a middle point and a third point;
(III) one group at a time from the central axis to the edge or from the edge to the central axis, analyzing the curvature of the surface at the middle point of the group by comparing a distance between the middle point and a line linking the first and the third points of the corresponding group with the predetermined surface tolerance;
(IV) projecting an additional point between the first and the middle points in the group, provided that the distance between the middle point and the line linking the first and third points of the group is larger than the predetermined surface tolerance, wherein point spacing between the first and additional points is equal to point spacing between the additional and middle points;
(V) repeating steps (ii) to (iv) until the distance between the middle point of each of the series of groups and the line linking the first and the third points of corresponding group along the probing spoke is equal to or less than the predetermined tolerance; and
(VI) outputting the number of the points to be projected onto the surface of the lens design along each of the number of evenly-spaced semi-diameter spokes and point spacings for pairs of neighboring points.

19. A method of claim 18, wherein the number of the evenly-spaced semi-diameter spokes is a number between 24 to 384.

20. A method of claim 19, wherein the contact lens is a customized contact lens or a contact lens having a complex surface design.

* * * * *